United States Patent
Jung et al.

(10) Patent No.: US 6,279,728 B1
(45) Date of Patent: Aug. 28, 2001

(54) ELECTRO-MAGNETIC CONVEYOR

(76) Inventors: Norbert G Jung; Elena Jung, both of 308 Tree Terrace Pkwy., Austell, GA (US) 30168

(*) Notice: Subject to any disclaimer, the term of this patent is extended or adjusted under 35 U.S.C. 154(b) by 0 days.

(21) Appl. No.: 09/016,972

(22) Filed: Jul. 20, 1998

(51) Int. Cl.[7] .............................. B65G 35/00; H02K 41/00

(52) U.S. Cl. .............................. 198/619; 198/619; 310/12

(58) Field of Search .......................... 198/619; 446/130; 414/217; 310/12; 264/288.4; 271/193; 104/281, 282, 284, 286

(56) References Cited

U.S. PATENT DOCUMENTS

| | | |
|---|---|---|
| 3,470,828 * | 10/1969 | Powell, Jr. et al. . |
| 3,589,300 * | 6/1971 | Wipf . |
| 3,645,377 * | 2/1972 | Zheigur et al. ................ 198/381 |
| 3,662,689 * | 5/1972 | Kawabe et al. ................ 104/285 |
| 3,717,103 * | 2/1973 | Guderjahn . |
| 3,750,129 * | 7/1973 | Takeno et al. ................ 198/810.02 |
| 3,783,794 * | 1/1974 | Gopfert et al. ................ 104/283 |
| 3,814,243 * | 6/1974 | Miller ................ 209/223.2 |
| 3,834,318 * | 9/1974 | Fellows et al. ................ 104/284 |
| 3,850,109 * | 11/1974 | Thornton ................ 104/285 |
| 3,884,154 * | 5/1975 | Marten ................ 104/286 |
| 3,903,809 * | 9/1975 | Miericke et al. ................ 104/285 |
| 3,911,828 * | 10/1975 | Schwarzler ................ 104/294 |
| 3,924,211 * | 12/1975 | Ioffe et al. ................ 335/284 |
| 3,951,074 * | 4/1976 | Cooper ................ 104/148 |
| 4,055,123 * | 10/1977 | Heidelberg ................ 104/283 |
| 4,180,257 * | 12/1979 | Buccicone ................ 271/193 |
| 4,387,508 * | 6/1983 | Wyatt ................ 29/738 |
| 4,624,617 * | 11/1986 | Belna . |
| 4,717,865 * | 1/1988 | Caputo ................ 318/362 |
| 4,817,494 * | 4/1989 | Cowan ................ 89/8 |
| 4,848,536 * | 7/1989 | Machida ................ 198/619 |
| 4,864,169 * | 9/1989 | Rioux et al. ................ 310/12 |
| 4,916,390 * | 4/1990 | Christoleit et al. ................ 324/174 |
| 4,934,297 * | 6/1990 | Azukizawa et al. ................ 104/130.02 |
| 4,949,950 * | 8/1990 | Stephany ................ 271/193 |
| 5,051,225 * | 9/1991 | Hommes et al. ................ 264/288.4 |
| 5,105,110 * | 4/1992 | Lapp et al. ................ 310/12 |
| 5,146,853 * | 9/1992 | Suppes ................ 104/138.2 |
| 5,148,753 * | 9/1992 | Lapp et al. ................ 104/290 |
| 5,156,093 * | 10/1992 | Azukizawa et al. ................ 104/284 |
| 5,163,222 * | 11/1992 | Imlig et al. ................ 29/827 |
| 5,163,546 * | 11/1992 | Kawada et al. ................ 198/619 |
| 5,172,803 * | 12/1992 | Lewin ................ 198/619 |
| 5,180,048 * | 1/1993 | Kawada et al. ................ 198/619 |
| 5,222,436 * | 6/1993 | Coffey ................ 104/281 |
| 5,222,689 * | 6/1993 | Simuni ................ 244/1 R |
| 5,251,741 * | 10/1993 | Morishita et al. ................ 198/690.1 |
| 5,253,592 * | 10/1993 | Coffey ................ 104/281 |
| 5,253,969 * | 10/1993 | Richert ................ 414/17 |
| 5,309,049 * | 5/1994 | Kawada et al. ................ 310/12 |
| 5,319,336 * | 6/1994 | Alcon ................ 335/296 |
| 5,402,021 * | 3/1995 | Johnson ................ 310/12 |
| 5,417,537 * | 5/1995 | Miller ................ 414/217 |
| 5,441,434 * | 8/1995 | Caulkins ................ 466/130 |

(List continued on next page.)

*Primary Examiner*—H. Grant Skaggs
*Assistant Examiner*—Jeffrey Shapiro (57) ABSTRACT

A transporter suitable for conveying ferro-magnetic materials [3] out of progressive-line transfer dies during stamping and other similar processes. This device does not utilize an inline synchronous or induction motor. In order to move the ferro-magnetic material out of said dies, the transporting system has coils wrapped around the core [1] (primary) insulated in their slots, said coils wrapped in a plane located at 90 degrees to the transfer plane so as to maintain one polarity along the transfer direction at any given time. To achieve continuous movement of the ferro-magnetic material [3] in the plane of transport, the current applied to the system is sequentially switched from coil [2] to coil using a mini programmable logic controller, or similar device. As this current is switched, the ferro-magnetic material behaves as a secondary, therefore applying motive force on the material in the transfer plane.

2 Claims, 8 Drawing Sheets

1. Coil
2. Core

U.S. PATENT DOCUMENTS

| | | | | |
|---|---|---|---|---|
| 5,483,111 | * | 1/1996 | Kuznetsov | 310/12 |
| 5,521,570 | * | 5/1996 | Ito et al. | 335/216 |
| 5,609,230 | * | 3/1997 | Swinbanks | 118/367 |
| 5,628,252 | * | 5/1997 | Kuznesotv | 104/284 |
| 5,641,054 | * | 6/1997 | Mori et al. | 198/619 |
| 5,649,489 | * | 7/1997 | Powell et al. | 104/282 |
| 5,666,883 | * | 9/1997 | Kunzetsov | 104/281 |
| 5,703,417 | * | 12/1997 | Kelly | 310/12 |
| 5,868,077 | * | 2/1999 | Kuznetsov | 104/281 |
| 6,012,208 | * | 1/2000 | Wiemers | 29/33 P |
| 6,045,319 | * | 4/2000 | Uchida et al. | 414/676 |

* cited by examiner

X - N Polarity
O - S Polarity

FIG. 3a
Prior Art

Secondary ( Ferro -Magnetic Material)   Primary (Ferro-Magnetic core)

1. Coil
2. Core

Fig. 4

X - N Polarity
O - S Polarity

W = Width - Variable
W1 = Width (at bottom) - Variable
L = Lenght - Variable
Angle = Deg. - Variable
Height = Variable

Estimation of Force - Speed

Fig.9

ELECTRO-MAGNETIC CONVEYOR

BACKGROUND OF THE INVENTION

1. Field of the invention:

This invention is related to an apparatus for transferring ferro-magnetic materials in various shapes, which are caused to behave as a secondary [3] by stepping the applied current from coil to coil with one polarity distributed along the transport plane so as to move the ferromagnetic materials.

2. Description of The Prior Art

There have been many types of carrying mechanisms employed for transporting ferro-magnetic materials. Some of the conventional transporters are shown in FIG. 1 through FIG. 3a.

Problems exhibited by these conventional systems are as follows. Shaker tray systems exhibit steady down time and noise pollution. Belt conveyor systems and shaker tray systems are characterized by much unnecessary, extensive down-time and money consuming maintenance costs. Systems having inline asynchronous motors can not transfer ferro-magnetic materials because of the north-south polarity sequence along the path of travel. Therefore, the material behaving as the secondary of such a system must be conductive non-magnetic material.

SUMMARY OF THE INVENTION

It is a primary object of the new invention to provide a transport system for ferro-magnetic materials such as iron or steel (coated or uncoated), or similar ferro-magnetic materials. This new transport system for ferro-magnetic materials has no mechanically moving parts, the material being moved becoming a secondary [3].

It is a further object of this new transporting system to minimize unnecessary, extensive down-time and money consuming maintenance costs.

It is a further object of this new invention to provide a ferro-magnetic material transporter system which consumes little power.

If the coils are in the same plane as the transfer plane, one shank becomes north in polarity while the other shank becomes south in polarity. The result is that the ferro-magnetic material will build up a magnetic closed-circuit preventing the material from moving (see prior art FIG. 3 and 3a). In comparison, according to the new invention, moving ferro-magnetic material [3] is accomplished when the coils [2] wrapped around core [1] and reside in a plane which is at 90 degrees to the transfer plane, so as to maintain only polarity along the transfer plane (See FIGS. 4 and 4a). A DC current is applied to the coils to minimize the electro-magnetic noise level.

According to the new invention, the ferro-magnetic material [3] can be continuously moved and accelerated on the transfer plane in the same direction. To achieve such a result, the current is applied to the coils, sequentially switching current from one coil [2] to the next coil through the use of a mini programmable logic controller, or a similar device.

The above mentioned features and advantages of the new invention, together with other objects and advantages, which will become apparent, will be more described hereinafter, with reference to the accompanying drawings forming an apparatus, wherein like numbers refer to like parts throughout.

DETAILED DESCRIPTION OF THE PREFERRED EMBODIMENTS

Figure 1:
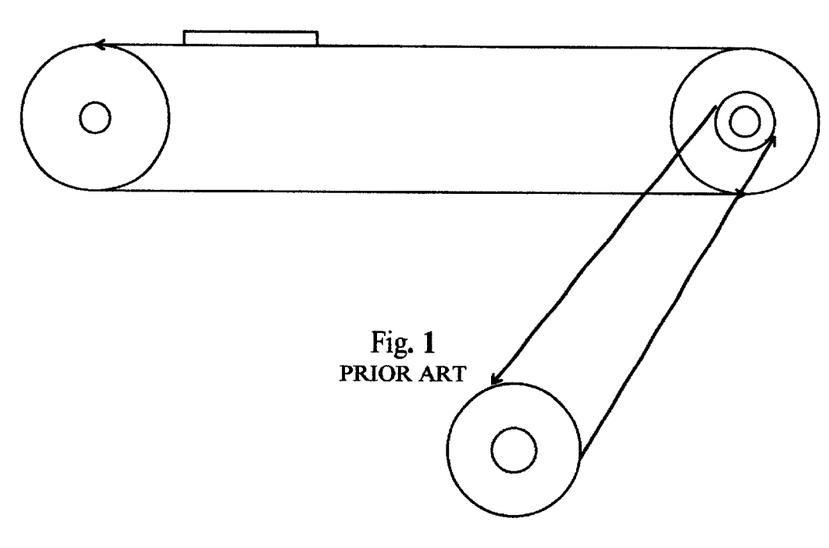
FIG. 1 illustrates a belt conveyor system where a material to be carried is placed on a belt which is driven by a motor and a drive mechanism.
Figure 2:
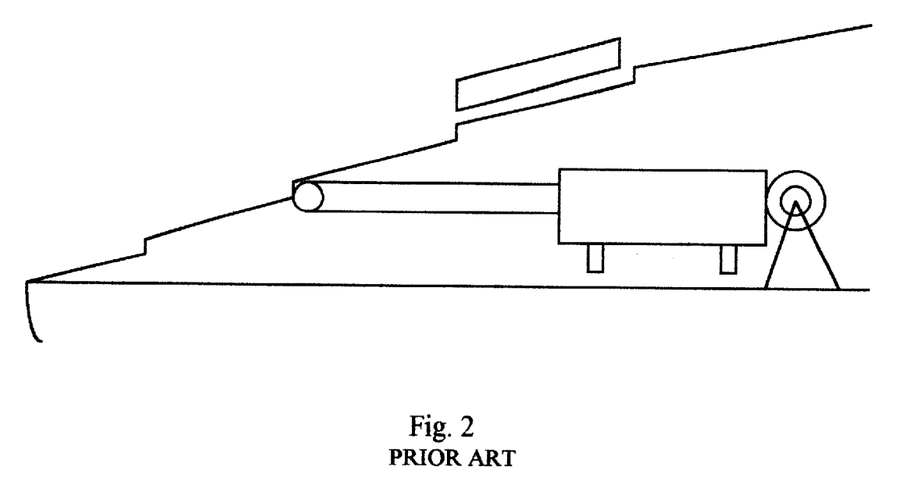
FIG. 2 illustrates a shaker tray activated by air, transporting any type of materials.
Figure 3:
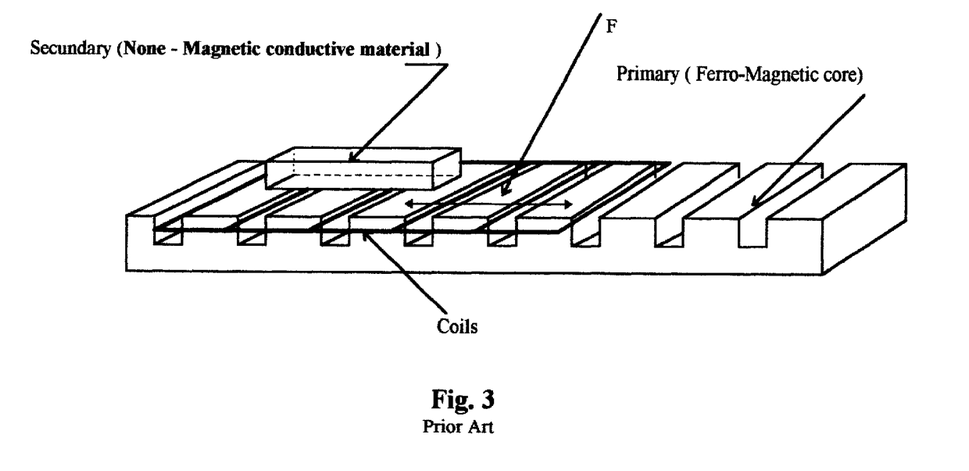
FIG. 3 illustrates a conventional inline asynchronous motor which transfers conductive non-magnetic materials such as aluminum and copper, for example.
Figure 3A:
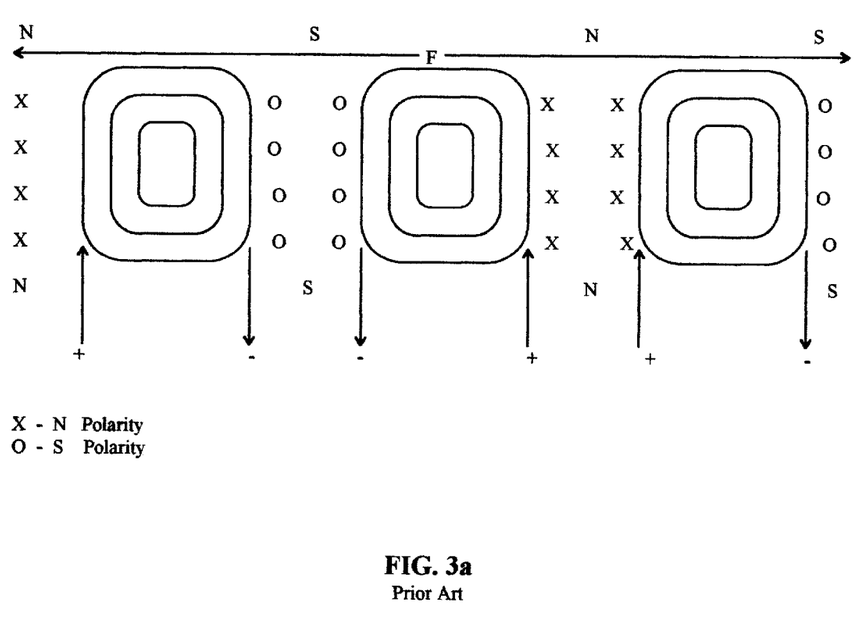
FIG. 3a illustrates a conventional inline asynchronous motor polarity layout.
Figure 4:
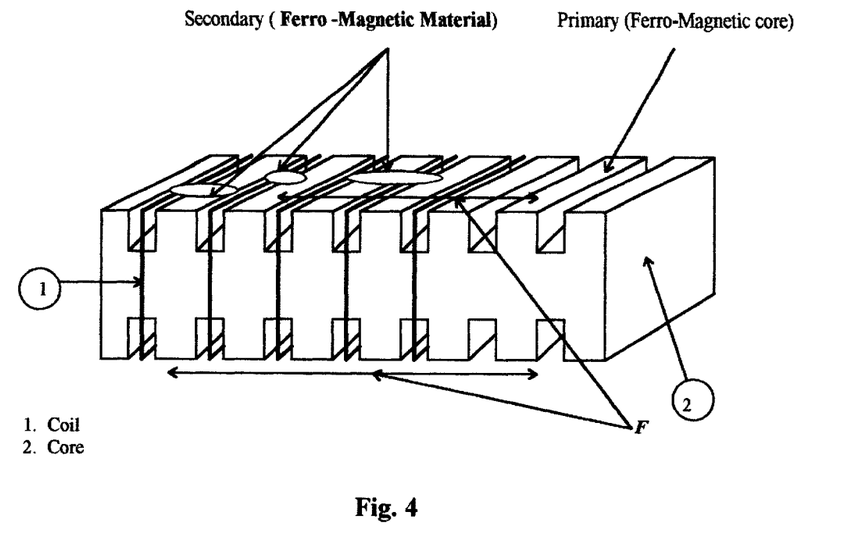
FIG. 4 schematically illustrates an electro-magnetic conveyor transporting ferro-magnetic material (secondary [3]) according to the new invention.
Figure 4A:
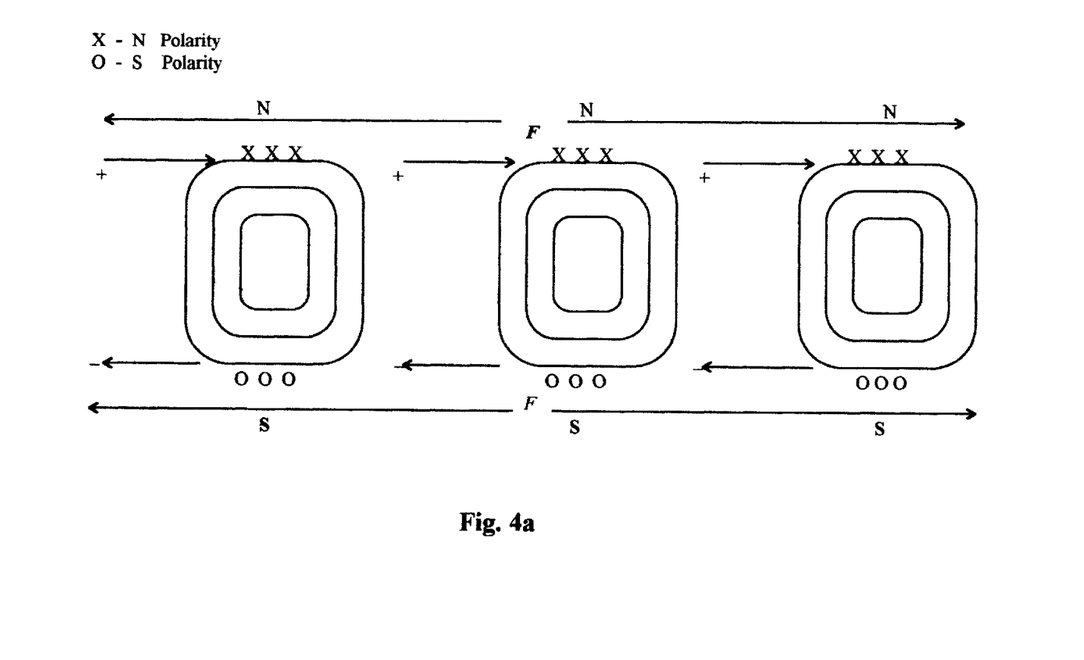
FIG. 4a illustrates an electro-magnetic conveyor polarity layout for transporting ferro-magnetic material.
Figure 4B:
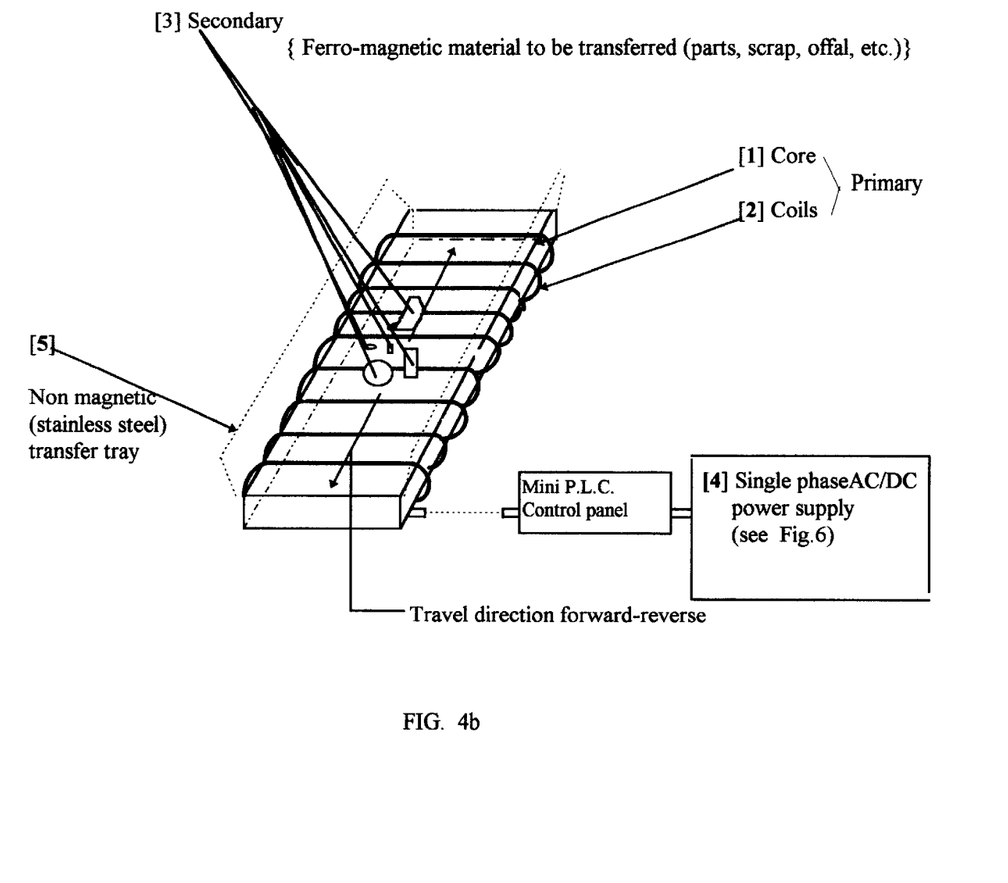
FIG. 4b illustrates a three-dimensional representation of the basic electro-magnetic conveyor system.
Figure 5:
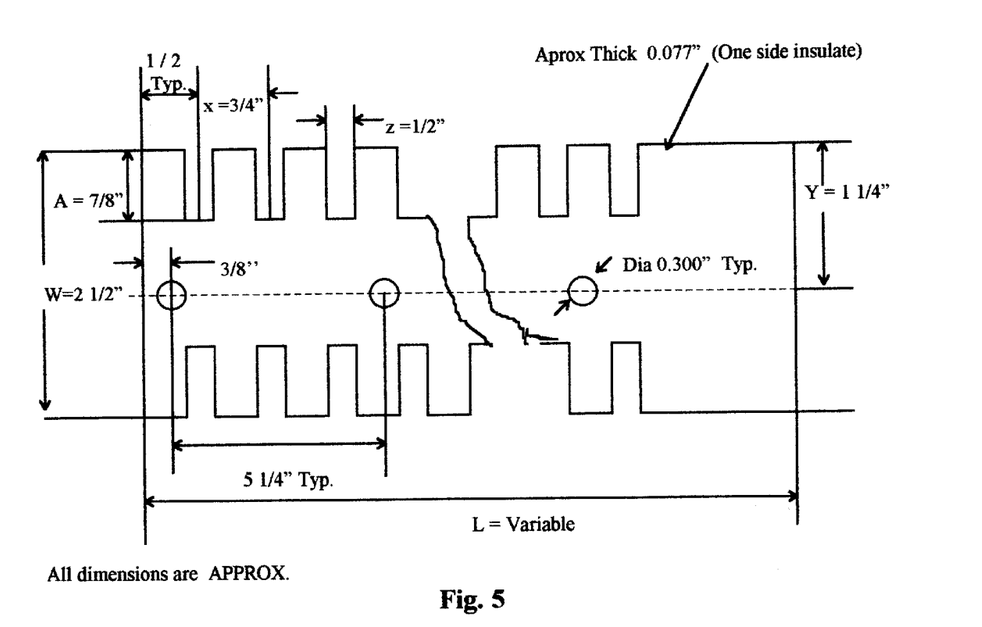
FIG. 5 illustrates a side view of an embodiment of the new invention.
Figure 5A:
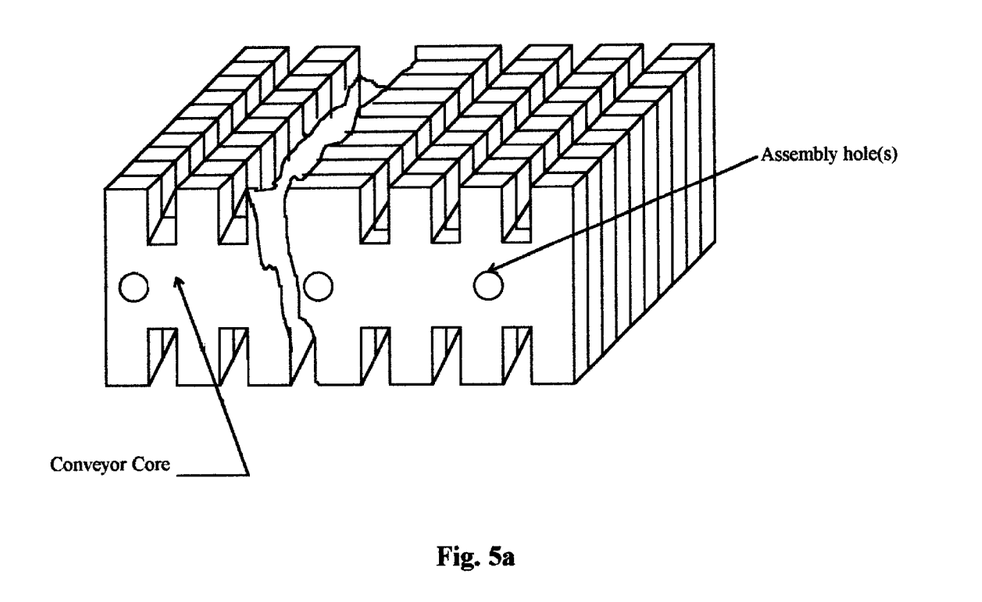
FIG. 5a illustrates a three-dimensional view of a typical core.
Figure 6:
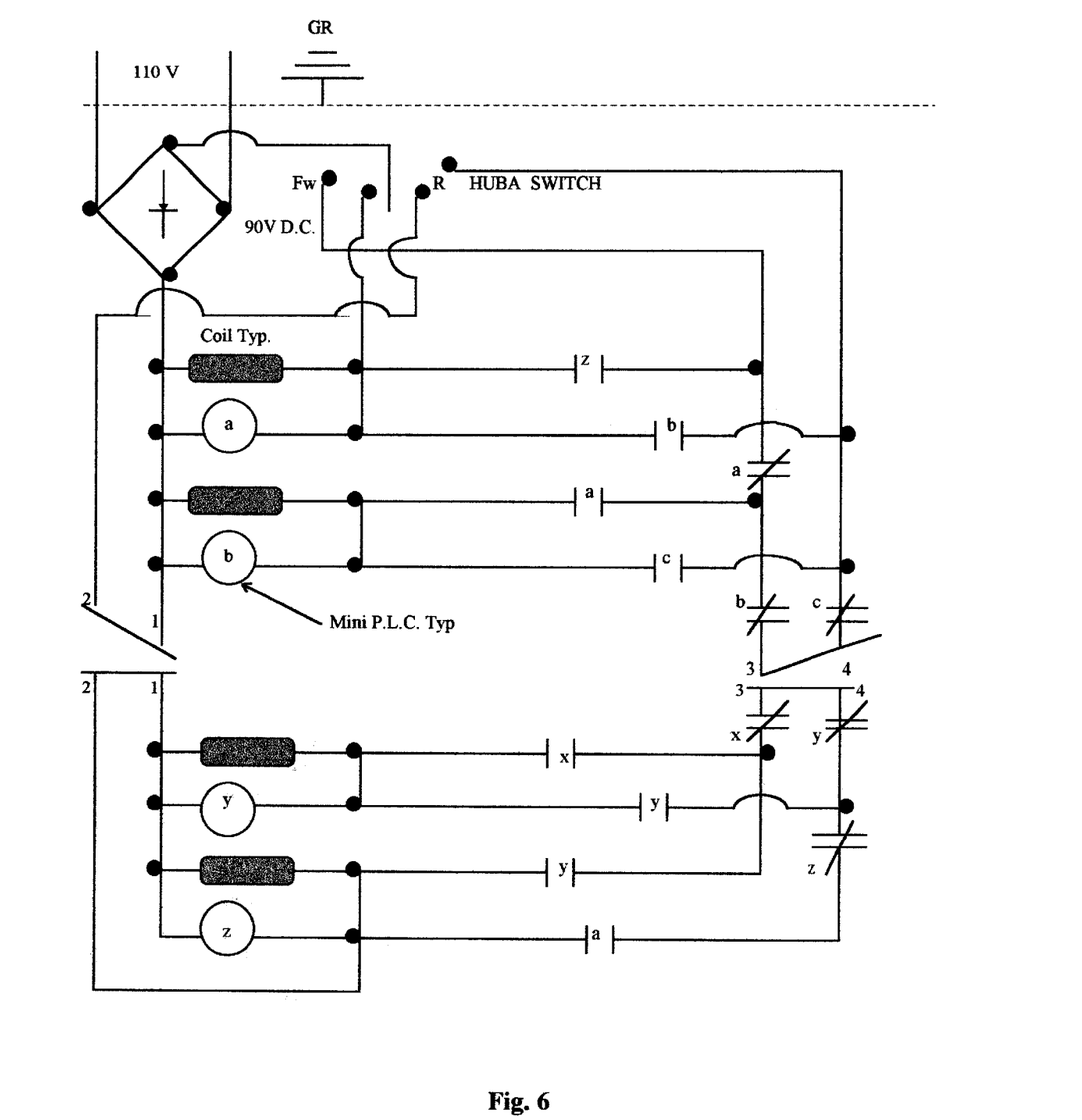
FIG. 6 illustrates an electro-schematic of the power supply [4] of the present invention.
Figure 7:
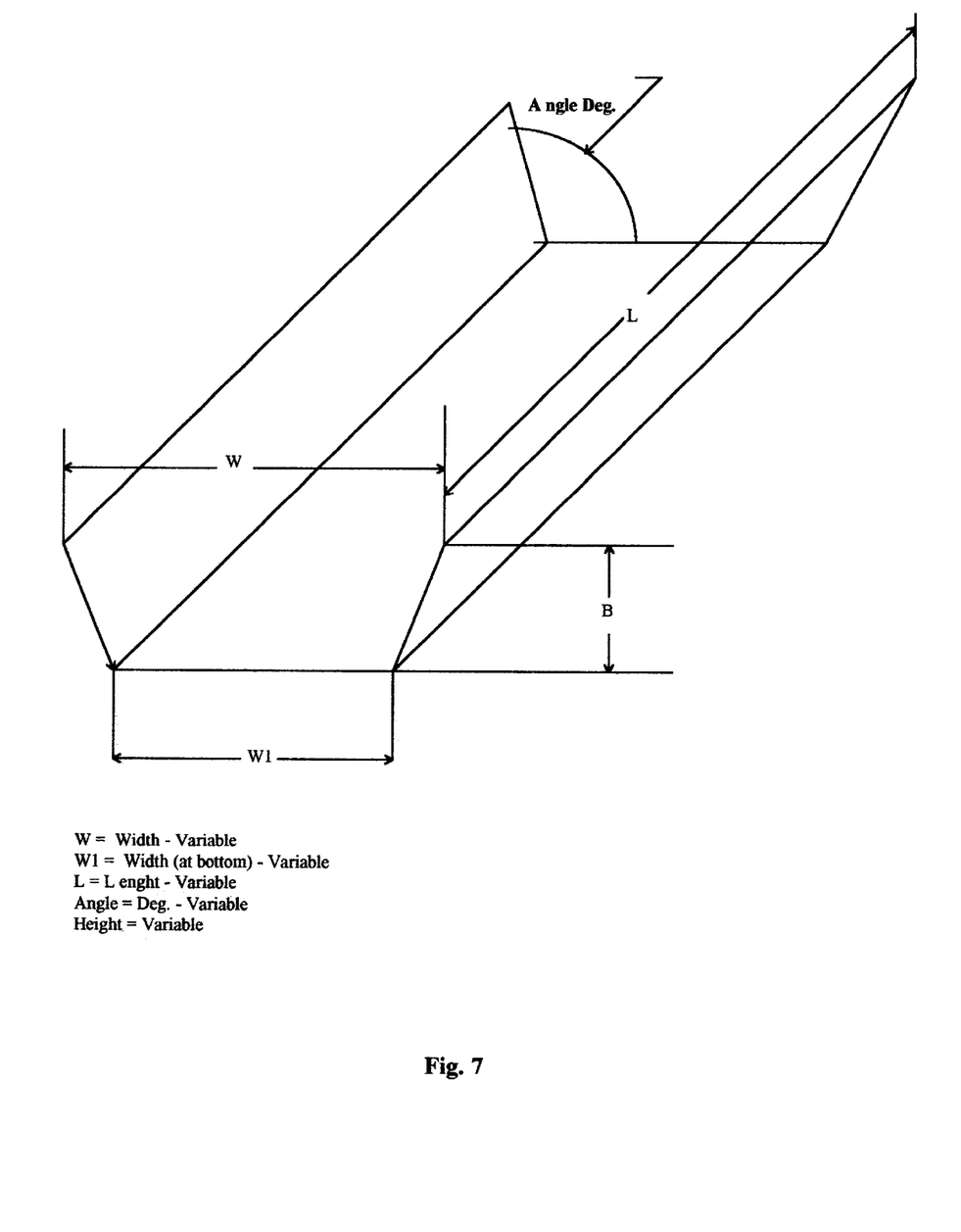
FIG. 7 illustrates a non-magnetic stainless steel tray [5] of the present invention.
Figure 8:
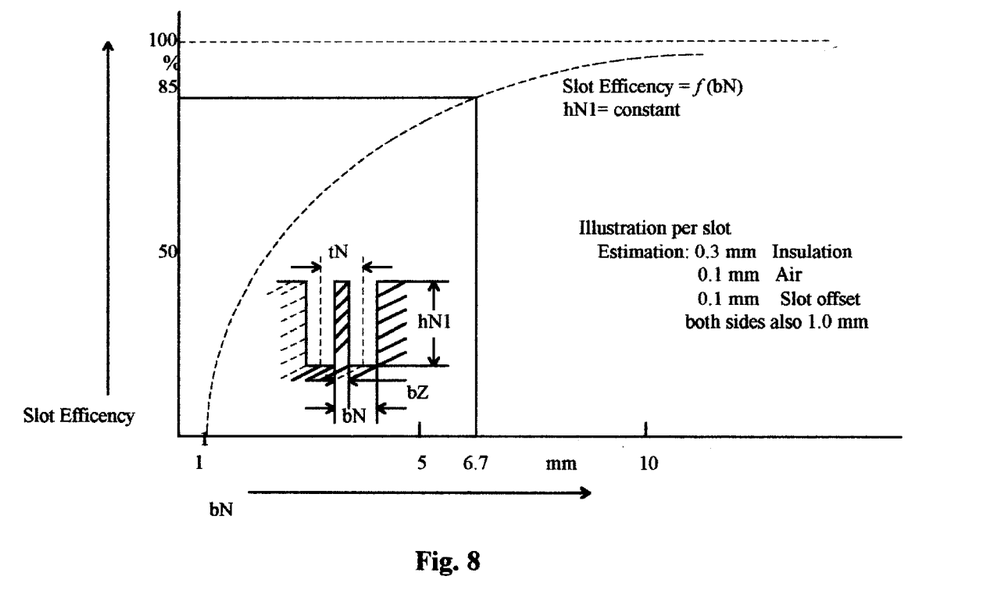
FIG. 8 illustrates a graph for estimating the most efficient slot sizes using distance, width, depth and cycle time.
Figure 9:
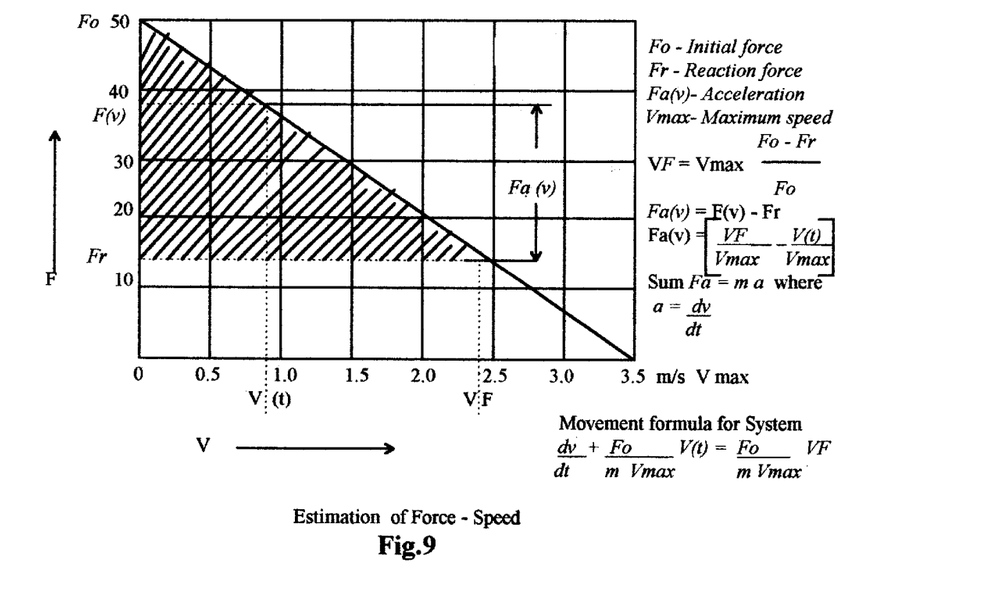
FIG. 9 illustrates a graph showing the relationship between forces (F), speed (V) and acceleration (a).

Referring to FIG. 4–4b, the principle of the new invention is hereinafter described. A basically ferro-magnetic core [1] with the coils [2] wound in a plane located at 90 degrees to the transporting plane, therefore effectuating maintenance of one polarity along the transport path, so as to transport ferro-magnetic material having various shapes and thicknesses in a continuous manner. The coils [2] have to be energized and de-energized in sequence using the circuitry as illustrated in FIG. 6. The conveyor core [1] as shown in FIG. 5a, is assembled of a number of detailed plates with approximate dimensions as shown in FIG. 5. In order to estimate the most efficient slot size and configuration, see FIG. 8 (illustration per slot). In order to estimate the force-speed-acceleration relationship of the movement produced by the transporting system, see FIG. 9.

What is claimed is:

1. An apparatus which transports materials in a plane, said apparatus comprising:

a. a core with wire coils wound in a plane at 90 degrees to the transfer plane to maintain only one polarity at any time on the transfer plane (only north or only south in the plane of transportation);

b. said materials being ferro-magnetic and serving as a secondary for said coils; and wherein said coils are energized and de-energized in sequence and in the transporting direction.

2. The apparatus as claimed in claim 1, further comprising a dc power supply for reducing magnetic noise pollution and overheating.

* * * * *